J. W. RENO.
POWER TRANSMISSION GEARING.
APPLICATION FILED MAR. 30, 1910.
965,408.
Patented July 26, 1910.
2 SHEETS—SHEET 2.
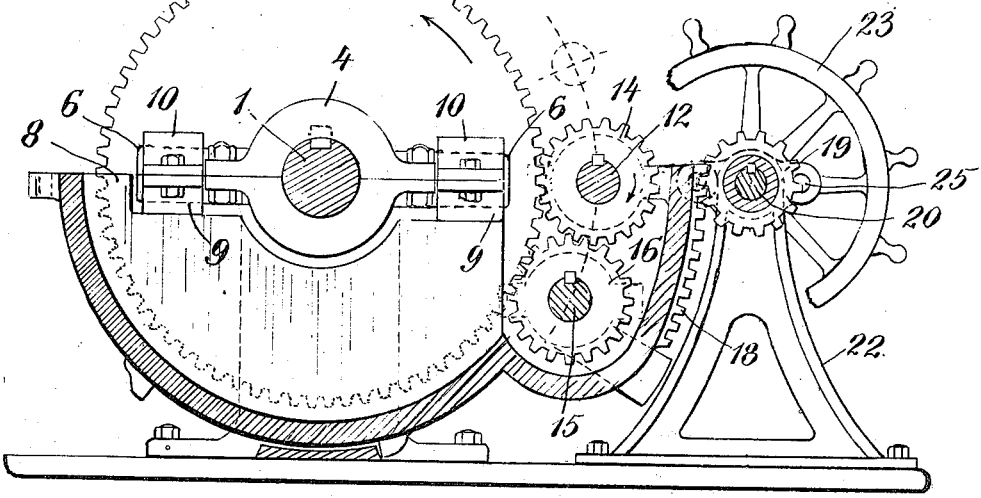
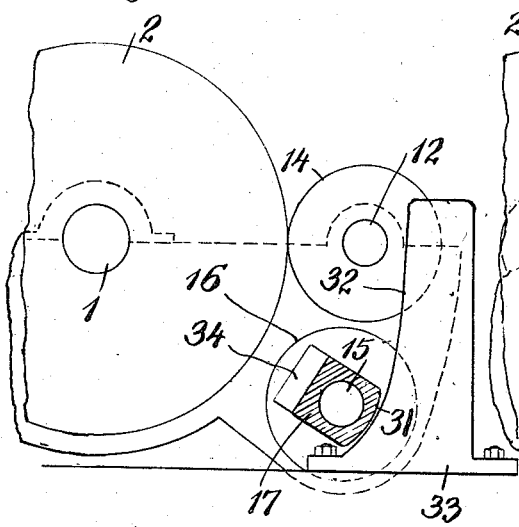
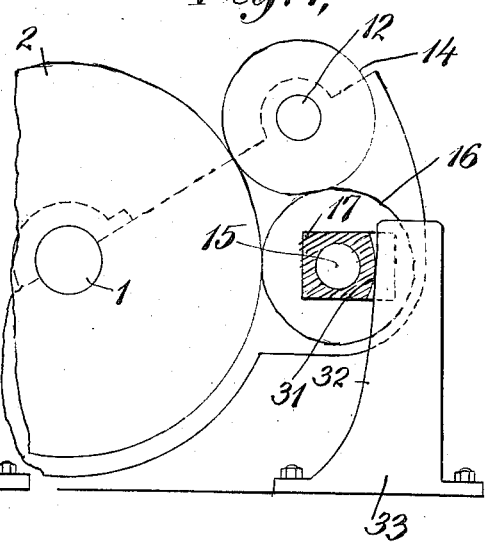
WITNESSES:
Ernest Miller
John F. Valentine
INVENTOR
Jesse W. Reno
BY
Charles S. Earll
ATTORNEY

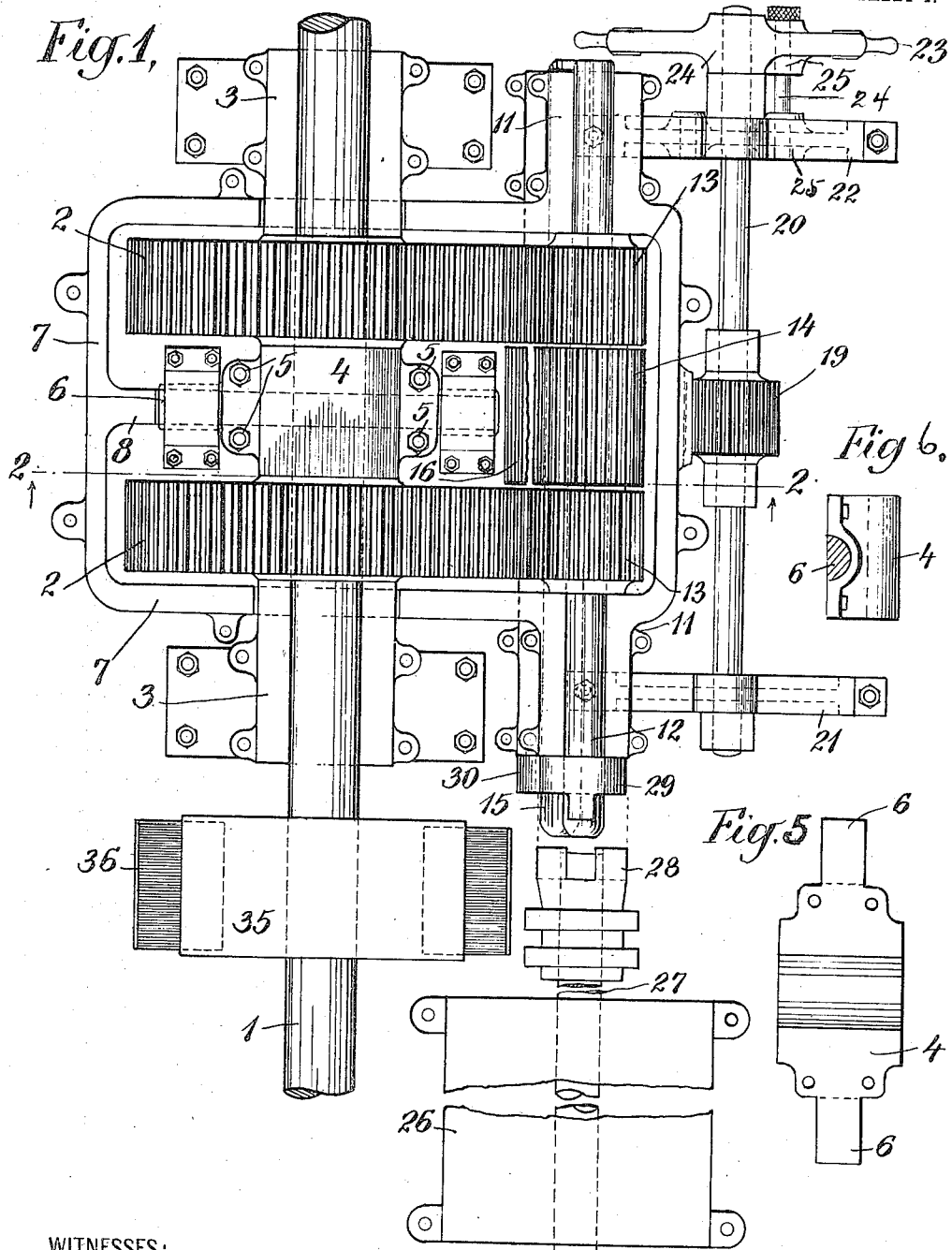

UNITED STATES PATENT OFFICE.

JESSE W. RENO, OF NEW YORK, N. Y.

POWER-TRANSMISSION GEARING.

965,408.  Specification of Letters Patent.  Patented July 26, 1910.

Application filed March 30, 1910. Serial No. 552,384.

*To all whom it may concern:*

Be it known that I, JESSE W. RENO, a citizen of the United States of America, and resident of the city, county, and State of New York, have invented certain new and useful Improvements in Power-Transmission Gearing, of which the following is a specification.

My invention relates to improvements in power transmitting mechanism.

The object of my invention is to provide a mechanism of this class which shall be simple and effective in its construction and operation and one which is especially adapted to transmit power from a prime mover operating at a relatively high speed, such as a steam turbine, to a relatively slow speed shaft, such as the propeller shaft of a boat.

It is well known that steam turbines operate best at a relatively high speed and that where circumstances permit a high rotative speed of the turbine rotor, a smaller and less expensive turbine may be used. Especially it has been found in the application of steam turbines for the propulsion of boats that notwithstanding the relatively and uneconomically great size of the turbines, the propellers being directly connected and operating in unison with the turbine shaft, have been compelled to run at a much higher speed than that which is found to be most efficient. At the same time the difficulties attending the use of ordinary forms of reduction gearing for the transmission of large powers at high speed, have prevented their use.

Another object of my invention is to provide a simple and efficient means whereby the driven member or shaft, such for instance as the propeller shaft of a boat, may be reversed without the necessity of reversing the direction of rotation of the steam turbine.

Heretofore the reversing of propellers driven by steam turbines has been accomplished by an auxiliary turbine or an auxiliary extension of the turbine rotor, which is cumbersome, inefficient and expensive.

My invention consists in mounting a pair of gears upon the driven shaft, in providing a pinion shaft which has a pair of pinions engaging the gears on said driven shaft, in mounting said pinion shaft in a frame which is adapted to pivot about the driven shaft and is also pivotally mounted on an axis normal to that of the driven shaft, whereby the alinement of said pinion shaft may automatically accommodate itself to any slight irregularities in the gears and pinions, in providing an auxiliary pinion shaft to which a pinion is secured which engages a pinion on the first named pinion shaft, in providing clutch members on the ends of each of said pinion shafts, in providing means for rotating the frame in which said pinion shafts are mounted about the driven shaft so as to bring either of said pinion shafts, at will, into alinement with a prime mover shaft, such as a steam turbine shaft, and in other novel features of construction to be hereinafter more fully pointed out and described.

In the drawings accompanying and forming part of this application, Figure 1 is a plan view of the preferred form of my invention, Fig. 2 is a transverse sectional view, Figs. 3 and 4 represent diagrammatic views corresponding to Fig. 2 showing the parts in different operative positions, and Figs. 5 and 6 represent plan and end views, respectively, of the frame-supporting bearing.

The reference characters are used in the same sense throughout the drawings and the specification.

Numeral 1 represents the driven shaft, such for instance as the propeller shaft of a boat. Upon this shaft rigidly secured thereto are mounted the two gears 2. These gears may be either of the ordinary spur gear form or of the form known as spiral gears. The shaft 1 runs in the stationary or fixed bearings 3. Upon the shaft 1, between the gears 2, is mounted a bearing 4 which is constructed of two half bearings provided with bolts 5 for clamping them together. The two parts of the bearing 4 are provided with semi-cylindrical extensions 6 which when the bearing is bolted together form a cylindrical journal. A frame 7 incloses the gears 2 and has a central web 8 upon which is formed a bearing 9 having caps 10 which receive the journal extensions 6 of the bearing 4. By means of this construction the frame 7 can rotate about the center of the shaft 1 and can also oscillate a small amount about the axis of the journals 6 which axis is normal or at right angles to the axis of the shaft 1. The purpose of this construction is to provide a universal joint connection between the frame and the gear shaft which will permit the pinion shaft 12 to accommodate itself to any slight irregularities in the gears 2 or pinions 13 and thereby to secure a uniform and equally distributed pressure between the teeth of the gears and the teeth of the pinions. The frame 7 is also provided with bearings 11 in which the pinion shaft 12 is journaled. The pinion shaft 12 has the pinions 13 which are in mesh with the gears 2, secured to it, and between the pinions 13 is a pinion 14 also secured to the pinion shaft 12. Beneath the pinion shaft 12, the pinion shaft 15 is journaled in sliding bearings 17 mounted in the elongated openings 34 in the frame 7. A pinion 16 is secured to the pinion shaft 15 and is adapted in one position to engage the pinion 14 and in its other position to pass out of engagement with said pinion. The frame 7 is provided with a rack 18 which is concentric with the shaft 1 and adapted to engage the pinion 19 secured to the shaft 20, which shaft 20 is journaled in the brackets 21 and 22. A hand wheel 23 is secured to the shaft 20 and a locking bolt 24 is mounted in said hand wheel adapted to engage an opening 25 in the bracket 22. A steam turbine or other prime mover is represented by numeral 26 and the prime mover shaft 27 is provided with a coupling member 28 adapted to engage one or other of the coupling members 29 or 30, according to which is brought into alinement with the prime mover shaft. The sliding bearings 17 in which the pinion shaft 15 is journaled are provided with surfaces 31 adapted to engage the cam surface 32 of the bracket 33, which cam surface is so constructed as to cause the bearings 17 to move in the elongated openings 34 until the pinion 16 passes into mesh with the pinion 14 as the pinion shaft 15 is swung into alinement with the prime mover shaft 27.

The driven shaft 1 is provided with a brake wheel 35 secured thereto and a brake 36 of any approved construction, the details of which are not shown in the drawings, is provided to engage the brake wheel 35 to hold the driven shaft 1 stationary while the prime mover shaft is being coupled or uncoupled from either the shaft 12 or the shaft 15.

When the parts are in the positions shown in Figs. 1, 2 and 3 the pinion shaft 12 is in alinement with the prime mover shaft 27 and when the coupling member 28 is engaged with the coupling member 29 the driven shaft will be driven in a direction the reverse of that of the direction of the prime mover shaft. When, however, the shaft 15 is brought into alinement and coupled with the prime mover shaft, the direction of the driven shaft will be reversed and it will then rotate in the same direction as the prime mover shaft.

Having thus described my invention, what I claim is:

1. In a power transmission gearing the combination with a shaft and a gear secured thereto, of a pinion shaft, a pinion secured to said pinion shaft, and a frame in which said pinion shaft is journaled, supported upon a pivot whose axis is at right angles to the axis of said pinion shaft.

2. In a power transmission gearing the combination with a shaft and a pair of gears secured thereon, of a pinion shaft, a pair of pinions secured thereon in mesh with said gears, a frame in which said pinion shaft is journaled and a pivotal support for said frame having its axis located between said gears and at right angles to said shafts.

3. In a power transmission gearing the combination with a gear shaft and a pair of gears secured thereon, of a pinion shaft, a pair of pinions secured thereon in mesh with said gears, a frame in which said pinion shaft is journaled, a bearing on said gear shaft between said gears, and a pivotal connection between said bearing and said frame having its axis normal to the axes of said shafts.

4. In a power transmission gearing the combination with a shaft and a gear secured thereon, of a pinion shaft, a pinion secured thereon in mesh with said gear, a frame in which said pinion shaft is journaled, adapted to turn about the axis of said gear shaft, a pinion shaft bearing movably mounted in said frame, a second pinion shaft journaled in said movable bearing, a pinion secured to said second pinion shaft and means for bringing it into and out of engagement with said first named pinion.

5. In a power transmission gearing the combination with a gear shaft and a pair of gears secured thereon, of a pinion shaft, a pair of pinions secured thereon in mesh respectively with said gears, a middle pinion on said pinion shaft between said pair of pinions, a second pinion shaft, a pinion secured thereon in mesh with said middle pinion, a frame in which said pinion shafts are journaled pivotally supported coaxially with said gear shaft.

6. In a power transmission gearing the combination with a gear shaft and a pair of gears secured thereon, of a pinion shaft, a pair of pinions secured thereon in mesh respectively with said gears, a middle pinion on said pinion shaft between said pair of pinions, a second pinion shaft, a pinion secured thereon in mesh with said middle pinion, a frame in which said pinion shafts are journaled pivotally supported coaxially with said gear shaft, a driving shaft, and means for turning said frame to bring one or the other of said pinion shafts in alinement with said driving shaft.

7. In a power transmitting mechanism the combination with a gear shaft and a pair of gears secured thereon, of a pinion shaft, a pair of pinions secured thereon in mesh with said gears and a third pinion secured thereon between the pinions of said pair, a second pinion shaft and a pinion secured thereon in mesh with the said third or middle pinion, a frame in which said pinion shafts are journaled, said frame being pivoted on two axes, one coincident with and the other normal to the axis of said gear shaft.

8. In a power transmitting mechanism the combination with a gear shaft and a pair of gears secured thereon, of a pinion shaft, a pair of pinions secured thereon in mesh with said gears and a third pinion secured thereon between the pinions of said pair, a second pinion shaft and pinion secured thereon in mesh with the said third or middle pinion, a frame in which said pinion shafts are journaled, said frame being pivoted on two axes, one coincident with and the other normal to the axis of said gear shaft, a driving shaft, and means for turning said frame to bring one or the other of said pinion shafts in alinement with said driving shaft.

9. In a power transmitting mechanism the combination with a gear shaft and a pair of gears secured thereon, of a pinion shaft, a pair of pinions secured thereon meshing with said gears and a third pinion between said pair, secured thereon, a second pinion shaft and a pinion secured thereon in mesh with said third or middle pinion, a frame in which said pinion shafts are journaled, a bearing on said gear shaft between said gears, and a pivotal connection having its axis normal to said gear shaft connecting said bearing and said frame.

10. In a power transmission gearing, the combination with a gear shaft and gear secured thereon, of a pinion shaft, a pinion secured thereon in mesh with said gear, a frame in which said pinion shaft is journaled, and a universal joint connection between said frame and said gear shaft.

11. In a power transmission gearing, the combination with a gear shaft and a gear secured thereon, of a pinion shaft, a pinion secured thereon in mesh with said gear, a frame in which said pinion shaft is journaled adapted to turn about the axis of said gear shaft, a bearing slidably mounted in said frame, a second pinion shaft mounted in said bearing, a pinion secured thereon, and a cam adapted to engage said slidable bearing.

12. In a power transmission mechanism the combination with a gear shaft and a pair of gears secured thereon, of a frame journaled on said shaft between said gears, a pinion shaft journaled in said frame, a pair of pinions secured on said pinion shaft engaging respectively said gears, a third pinion on said pinion shaft, a second pinion shaft journaled in said frame, and a pinion secured thereon in mesh with said third pinion.

13. In a power transmission mechanism the combination with a gear shaft and a pair of gears secured thereon, of a frame journaled on said shaft between said gears, a pinion shaft journaled in said frame, a pair of pinions secured on said pinion shaft engaging respectively said gears, a third pinion on said pinion shaft, a second pinion shaft journaled in said frame, a pinion secured thereon in mesh with said third pinion, and means for rocking said frame about the axis of said gear shaft.

14. In a power transmission mechanism the combination with a gear shaft and a pair of gears secured thereon, of a frame journaled on said shaft between said gears, a pinion shaft journaled in said frame, a pair of pinions secured on said pinion shaft engaging respectively said gears, a third pinion on said pinion shaft, a second pinion shaft, bearings in which said second pinion shaft is journaled slidably mounted in said frame, and a pinion secured to said second pinion shaft adapted to be brought into and out of operative engagement with said third pinion on said first named pinion shaft.

In testimony whereof, I have signed my name to this specification in the presence of two subscribing witnesses.

JESSE W. RENO.

Witnesses:
WILLIAM HAGENAH,
WM. ROBINSON.